United States Patent
Karimi et al.

(10) Patent No.: US 9,646,114 B2
(45) Date of Patent: May 9, 2017

(54) ELECTRICAL POWER SYSTEM STABILITY

(71) Applicant: The Boeing Company, Chicago, IL (US)

(72) Inventors: Kamiar J. Karimi, Kirkland, WA (US); Eugene V. Solodovnik, Lake Stevens, WA (US); Zachary R. Lewis, Seattle, WA (US); Jeffrey Joseph White, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 800 days.

(21) Appl. No.: 13/938,588

(22) Filed: Jul. 10, 2013

(65) Prior Publication Data
US 2015/0019175 A1 Jan. 15, 2015

(51) Int. Cl.
*G06F 17/50* (2006.01)
*H02J 3/00* (2006.01)
(Continued)

(52) U.S. Cl.
CPC .......... *G06F 17/50* (2013.01); *G06F 17/5022* (2013.01); *B64D 2221/00* (2013.01); *G05B 17/02* (2013.01); *G05B 23/0256* (2013.01); *G06F 2217/78* (2013.01); *H02J 2003/007* (2013.01); *Y04S 40/22* (2013.01)

(58) Field of Classification Search
None
See application file for complete search history.

(56) References Cited

U.S. PATENT DOCUMENTS 4,827,417 A * 5/1989 Berger ................. G05D 1/0607
244/182
5,023,791 A * 6/1991 Herzberg ........... G05B 23/0283
324/73.1
(Continued)

FOREIGN PATENT DOCUMENTS

EP 1560087 A2 8/2005
EP 1933214 A2 6/2008
(Continued)

OTHER PUBLICATIONS

Breit et al, "Electric System Stabilizing System for Aircraft," U.S. Appl. No. 13/561,572, filed Jul. 30, 2012, 74 pages.
(Continued)

*Primary Examiner* — Kibrom K Gebresilassie
(74) *Attorney, Agent, or Firm* — Yee & Associates, P.C.

(57) ABSTRACT

A method and apparatus for establishing a validated stable design for a stable electrical power system. An initial design for an electrical power system is established. The initial design for the electrical power system satisfies design requirements. The initial design for the electrical power system is simulated for a plurality of simulated operating conditions for the electrical power system to generate simulation data. Stability parameter requirements for a stable design for the electrical power system are established from the simulation data. A hardware implementation of the stable design for the electrical power system is tested to generate hardware testing data. The stable design for the electrical power system is validated using the hardware testing data to establish a validated stable design for the electrical power system.

20 Claims, 10 Drawing Sheets

(51) Int. Cl.
*G05B 17/02* (2006.01)
*G05B 23/02* (2006.01)

(56) References Cited

U.S. PATENT DOCUMENTS

| | | | | |
|---|---|---|---|---|
| 5,111,402 | A * | 5/1992 | Brooks | G01R 31/008 |
| | | | | 324/73.1 |
| 5,260,874 | A * | 11/1993 | Berner | G09B 9/24 |
| | | | | 434/242 |
| 6,216,063 | B1 | 4/2001 | Lind | B64F 5/0045 |
| | | | | 701/10 |
| 6,341,247 | B1 * | 1/2002 | Hreha | B64C 13/503 |
| | | | | 244/13 |
| 7,047,176 | B2 * | 5/2006 | Klevans | H04L 41/12 |
| | | | | 703/17 |
| 7,171,653 | B2 * | 1/2007 | Albrecht | G06F 9/455 |
| | | | | 714/E11.21 |
| 7,225,416 | B1 | 5/2007 | Pritchard et al. | |
| 7,337,058 | B1 * | 2/2008 | Mylaraswamy | G07C 5/006 |
| | | | | 701/101 |
| 7,406,370 | B2 * | 7/2008 | Kojori | G05B 9/03 |
| | | | | 180/65.8 |
| 8,155,876 | B2 * | 4/2012 | White | B64D 41/00 |
| | | | | 318/432 |
| 8,437,977 | B1 * | 5/2013 | Woodard, II | G01P 21/00 |
| | | | | 701/29.2 |
| 8,849,603 | B2 * | 9/2014 | Boldrin | G01M 17/00 |
| | | | | 702/113 |
| 2003/0132821 | A1 * | 7/2003 | Otsuka | H01P 3/026 |
| | | | | 333/239 |
| 2006/0042846 | A1 * | 3/2006 | Kojori | G05B 9/03 |
| | | | | 180/65.8 |
| 2006/0113801 | A1 * | 6/2006 | Schubert | F03D 1/003 |
| | | | | 290/44 |
| 2008/0109205 | A1 * | 5/2008 | Nasle | G06F 17/5009 |
| | | | | 703/18 |
| 2009/0164695 | A1 * | 6/2009 | Xiong | G06F 11/24 |
| | | | | 710/316 |
| 2009/0302153 | A1 * | 12/2009 | Matasso | B64C 13/50 |
| | | | | 244/99.2 |
| 2010/0018301 | A1 * | 1/2010 | Lutke | B64C 1/36 |
| | | | | 73/118.03 |
| 2010/0208393 | A1 * | 8/2010 | Vedula | H02H 7/26 |
| | | | | 361/18 |
| 2010/0312420 | A1 * | 12/2010 | Sham | G06Q 10/00 |
| | | | | 701/3 |
| 2012/0078436 | A1 * | 3/2012 | Patel | G06N 3/08 |
| | | | | 700/298 |
| 2012/0179326 | A1 * | 7/2012 | Ghelam | G05B 17/02 |
| | | | | 701/31.9 |
| 2012/0185201 | A1 * | 7/2012 | Chen | G01R 31/40 |
| | | | | 702/118 |
| 2012/0308965 | A1 * | 12/2012 | Andrews | G09B 9/08 |
| | | | | 434/30 |
| 2013/0125083 | A1 * | 5/2013 | Kusumoto | G06F 17/5063 |
| | | | | 716/136 |
| 2013/0286515 | A1 * | 10/2013 | White | H02H 3/0935 |
| | | | | 361/42 |
| 2013/0346057 | A1 * | 12/2013 | Lin | H02J 3/00 |
| | | | | 703/18 |
| 2014/0122050 | A1 * | 5/2014 | Fu | H02J 4/00 |
| | | | | 703/18 |
| 2014/0379321 | A1 * | 12/2014 | Xu | H04L 41/145 |
| | | | | 703/14 |
| 2016/0149404 | A1 * | 5/2016 | Karimi | H02J 3/46 |
| | | | | 307/9.1 |

FOREIGN PATENT DOCUMENTS

| | | |
|---|---|---|
| WO | WO0195161 A2 | 12/2001 |
| WO | WO2009048963 A1 | 4/2009 |
| WO | 2012081174 A1 | 6/2012 |

OTHER PUBLICATIONS

Breit et al., "Electric System Stabilizing System for Aircraft," U.S. Appl. No. 13/561,670, filed Jul. 30, 2012, 63 pages.
Fu et al., "Electrical Power System Stability Optimization System," U.S. Appl. No. 13/663,884, filed Oct. 30, 2013, 59 pages.
European Search Report, dated Nov. 30, 2015, regarding Application No. EP14176383.9, 12 pages.
Huan Xu, "Design, Specification, and Synthesis of Aircraft Electric Power Systems Control Logic," Thesis for the Degree of Doctor of Philosophy from California Institute of Technology, May 31, 2013, 140 pages, accessed Nov. 11, 2015, http://www.aero.umd.edu/~mumu/files/HuanXu_Thesis.pdf.
Nuzzo et al., "A Contract-Based Methodology for Cyber-Physical System Design," ExCAPE Annual PI Meeting, Jun. 11, 2013, 1 page, accessed Nov. 11, 2015, https://excape.cis.upenn.edu/documents/Contract-BasedMethodology_000.pdf.

* cited by examiner

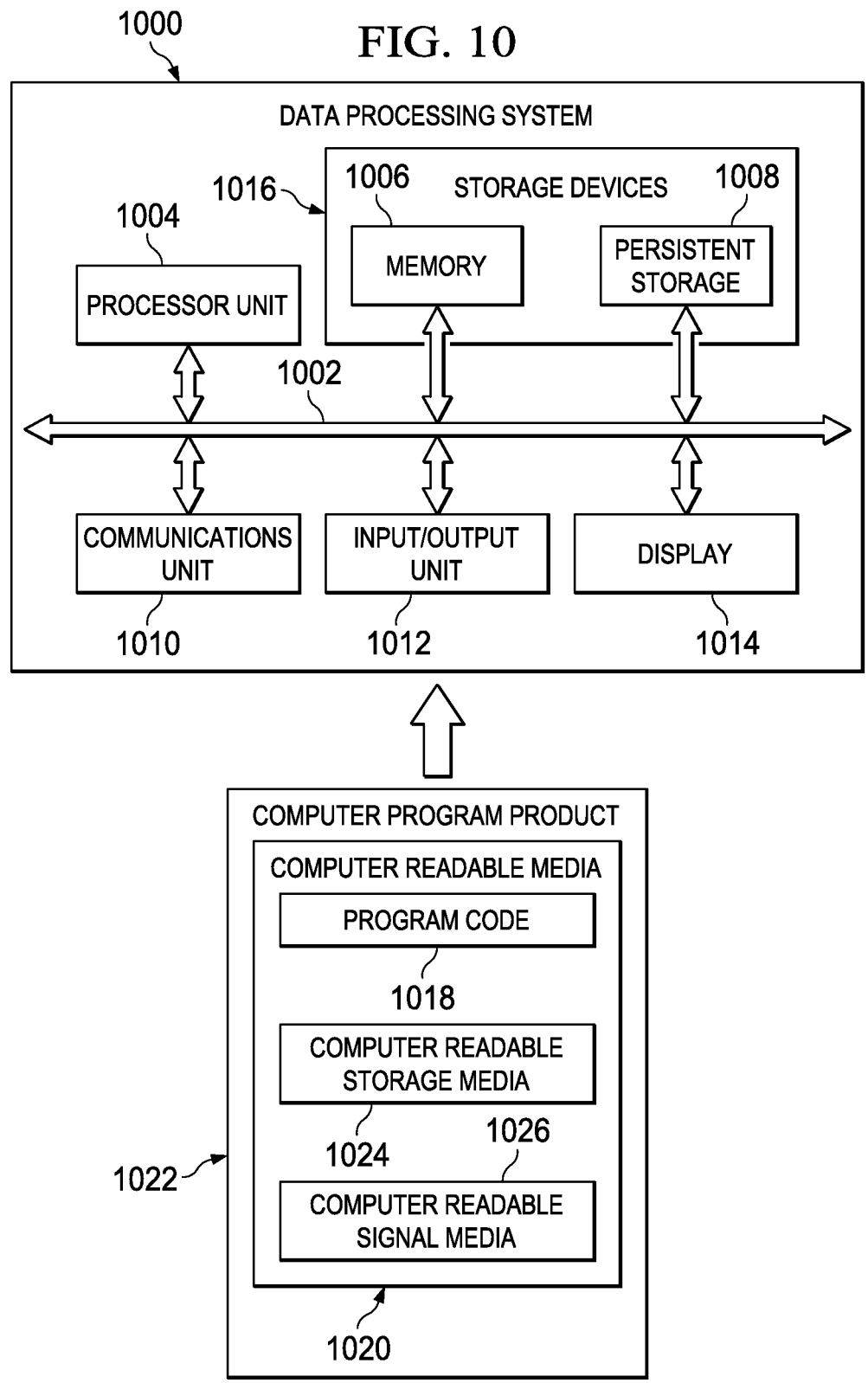

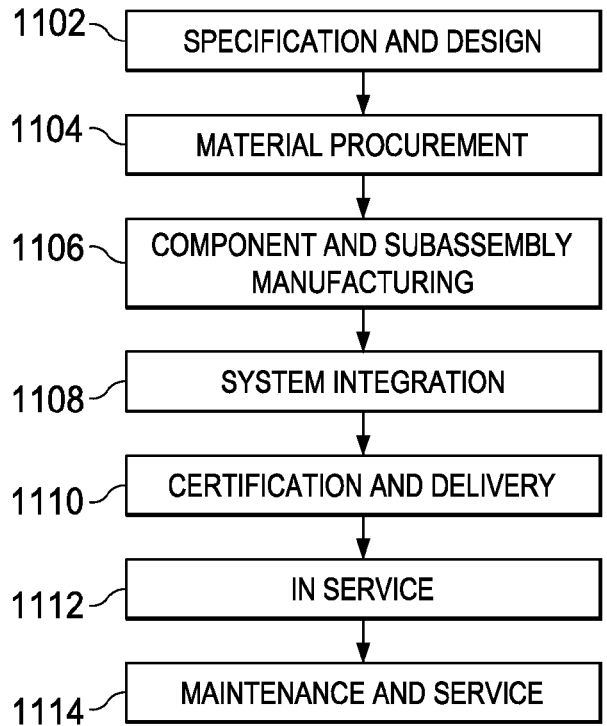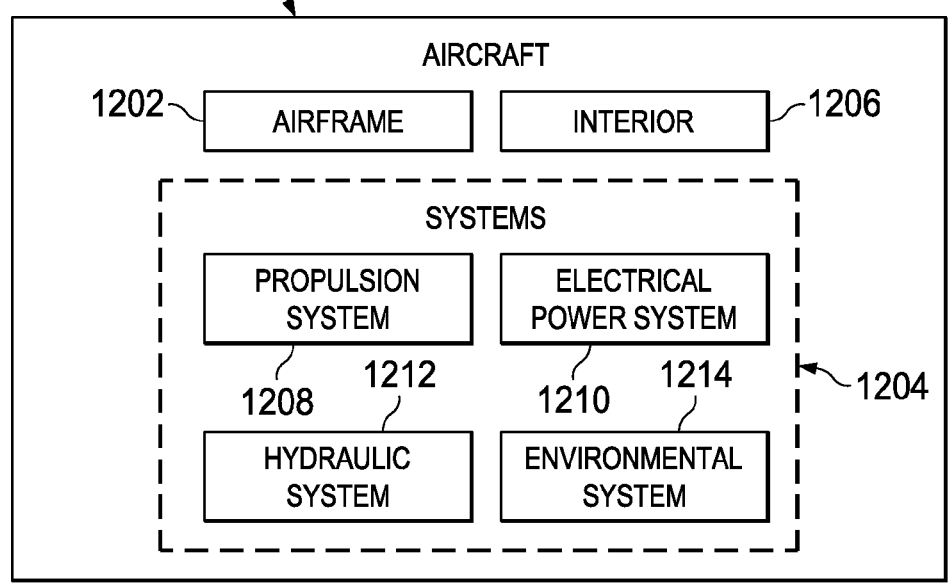

ELECTRICAL POWER SYSTEM STABILITY

BACKGROUND INFORMATION

1. Field

The present disclosure relates generally to systems and methods for designing electrical power systems. More particularly, the present disclosure relates to a system and method for designing stable electrical power systems and for assessing the stability of three-phase alternating current power systems equipped with direct current power conversion equipment and active direct current loads.

2. Background

Aircraft may employ various electronic devices and systems for performing various functions on the aircraft. Power for the electronic devices and systems on an aircraft may be provided by an aircraft electrical power system. The aircraft electrical power system may include a number of generators along with various power distribution and conversion systems. For example, the electrical power system on an aircraft may include a number of generators driven by the aircraft engines.

The stability of an electrical power system may be defined as the ability of the system to regain a normal state of equilibrium after being subjected to a disturbance. It is desirable that an electrical power system on an aircraft may be designed for stability.

Many of the electrical loads on an aircraft may use regulated power electronics in order to improve efficiency, power quality, and power density. Such electrical loads may affect the stability of the electrical power system on an aircraft in undesired ways.

It may be desirable to optimize the electrical power system on an aircraft to ensure stability in the power efficiency, density and quality. Furthermore, failure to optimize the electrical power systems on aircraft may increase costs. Less than optimal power systems may be overdesigned, heavier, and have larger volumetric stowage requirements. Therefore, aircraft equipped with less than optimal power systems may use more fuel during operation. In this era of ever increasing fuel costs, having solutions that address this problem have become even more important. Similarly, less than optimal power systems may require more frequent maintenance and components of such systems may need to be repaired and replaced more often. Therefore, such systems may have higher lifecycle costs.

Optimizing the stability of the electrical power system on an aircraft may present several technical problems. Currently available systems and methods for analyzing the stability of electrical power system designs may be limited and may not provide solutions to the technical problem of optimizing the stability of an electrical power system on an aircraft.

Accordingly, it would be beneficial to have a method and apparatus that take into account one or more of the issues discussed above as well as possibly other issues.

SUMMARY

The illustrative embodiments of the present disclosure provide an apparatus comprising a design system, a simulation system, a stability evaluation system, and a hardware testing system. The design system is configured to establish an initial design for an electrical power system. The initial design for the electrical power system satisfies design requirements for the electrical power system. The simulation system is configured to simulate the initial design for the electrical power system for a plurality of simulated operating conditions for the electrical power system to generate simulation data. The stability evaluation system is configured to establish stability parameter requirements for a stable design for the electrical power system from the simulation data. The hardware testing system is configured to test a hardware implementation of the stable design for the electrical power system to generate hardware testing data. The stability evaluation system is configured to use the hardware testing data to validate the stable design for the electrical power system to establish a validated stable design for the electrical power system.

The illustrative embodiments of the present disclosure also provide a method for establishing a validated stable design for a stable electrical power system. An initial design for an electrical power system is established. The initial design for the electrical power system satisfies design requirements for the electrical power system. The initial design for the electrical power system is simulated for a plurality of simulated operating conditions for the electrical power system to generate simulation data. Stability parameter requirements for a stable design for the electrical power system are established from the simulation data. A hardware implementation of the stable design for the electrical power system is tested to generate hardware testing data. The stable design for the electrical power system is validated using the hardware testing data to establish a validated stable design for the electrical power system.

The illustrative embodiments of the present disclosure also provide a method for certifying a change to a design for a stable electrical power system. An initial design for an electrical power system is established. The initial design for the electrical power system satisfies design requirements for the electrical power system. The initial design for the electrical power system is simulated for a plurality of simulated operating conditions for the electrical power system to generate simulation data. Stability parameter requirements for a stable design for the electrical power system are established from the simulation data. A hardware implementation of the stable design for the electrical power system is tested to generate hardware testing data. The stable design for the electrical power system is validated using the hardware testing data to establish a validated stable design for the electrical power system. A validated simulation model of the validated stable design for the electrical power system is established. A change to the validated stable design for the electrical power system is certified by a simulation using the validated simulation model.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 10 is an illustration of a block diagram of a data processing system in accordance with an illustrative embodiment;

FIG. 11 is an illustration of a block diagram of an aircraft manufacturing and service method in accordance with an illustrative embodiment; and FIG. 12 is an illustration of a block diagram of an aircraft in accordance with an illustrative embodiment.

DETAILED DESCRIPTION

The different illustrative embodiments recognize and take into account a number of different considerations. "A number of," as used herein with reference to items, means one or more items. For example, "a number of different considerations" means one or more different considerations.

The different illustrative embodiments recognize and take into account that modern commercial and other aircraft may be equipped with an electrical power system that includes a relatively high voltage DC subsystem. For example, the high voltage DC power system on such aircraft may include devices for generating high voltage DC power and motor control loads.

The different illustrative embodiments recognize and take into account that traditional commercial aircraft power systems may not utilize high voltage DC power and active motor control loads. Therefore, currently available systems and methods for analyzing and ensuring power system stability may not be used effectively to analyze and ensure power system stability in aircraft that utilize such high voltage DC power and active motor control loads.

Therefore, illustrative embodiments provide a system and method for assessing and ensuring the stability of electrical power systems on aircraft comprising high voltage DC subsystems. In particular, illustrative embodiments provide a system and method for the design and assessment of stable three-phase AC power systems equipped with high voltage DC power conversion equipment and active motor loads driven by motor controllers with a constant power draw nature.

The different illustrative embodiments also recognize and take into account that design changes to a power system on an aircraft or other vehicle may be certified for safety or other purposes before such changes are implemented in the power system on the aircraft or other vehicle. Currently, such certification may typically be performed by hardware testing. Such testing may be relatively expensive and time consuming.

Therefore, the illustrative embodiments provide a system and method for generating a simulation model for a power system and for validating the simulation model with hardware for the power system as implemented on an aircraft or other vehicle. Validation of the simulation model ensures that the simulation model and the hardware are equivalent and that the design of the power system is complete. The validated simulation model may be used to certify design changes to the power system by simulation. Such certification by simulation may be less expensive and time consuming than certification by hardware testing.

Figure 1:
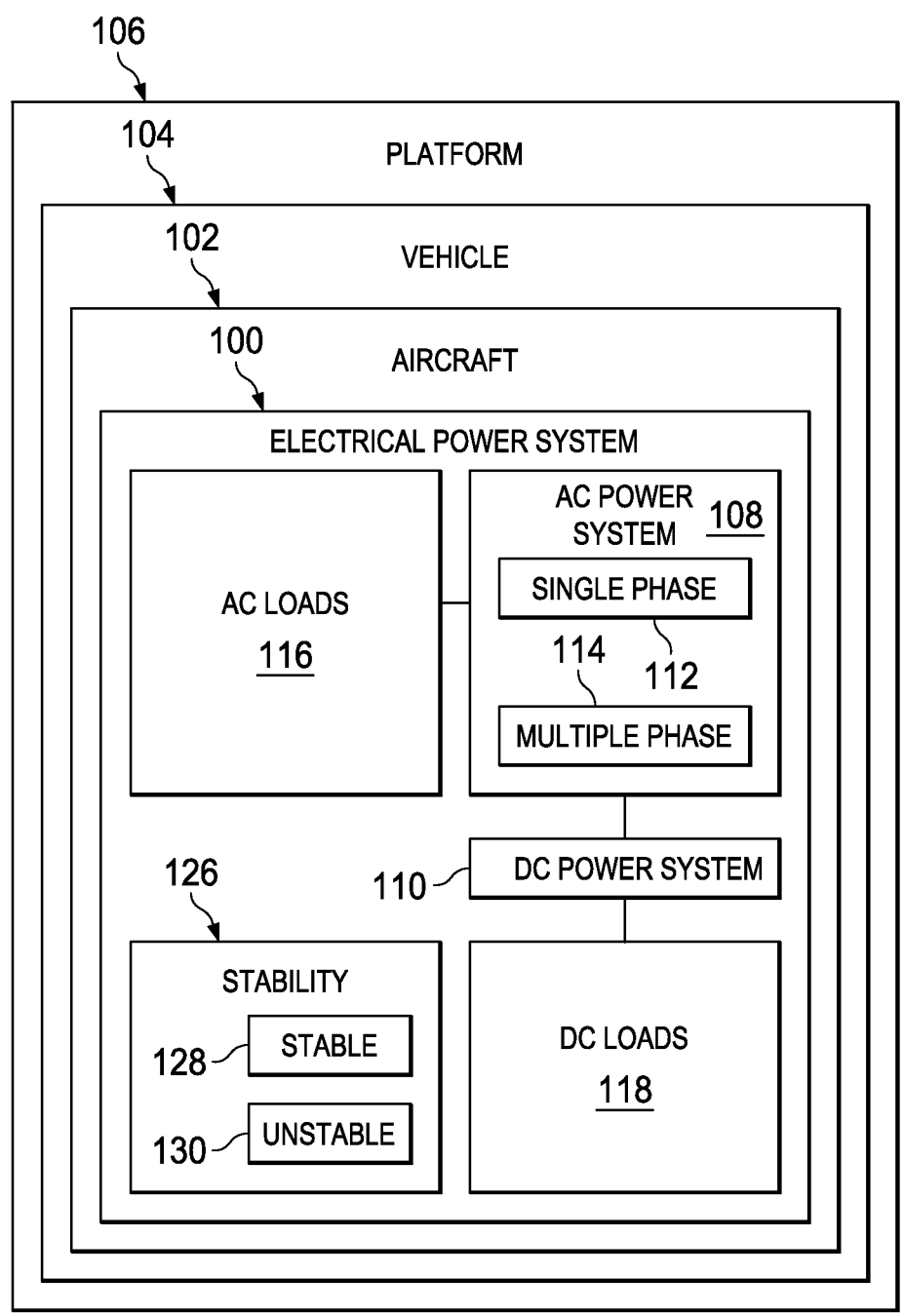
FIG. 1 is an illustration of a block diagram of an electrical power system on an aircraft in accordance with an illustrative embodiment.

Turning now to FIG. 1, an illustration of a block diagram of an electric power system on an aircraft is depicted in accordance with an illustrative embodiment. In this example, electrical power system 100 may provide electrical power for aircraft 102.

Aircraft 102 may be any type of aircraft. For example, without limitation, aircraft 102 may be a fixed wing, rotary wing, or lighter than air aircraft. Aircraft 102 may be configured for carrying passengers, cargo, or both passengers and cargo, or may be used for performing any other operation or mission. Aircraft 102 may be operated by an airline, a military unit, or any other private or government entity.

Aircraft 102 is an example of vehicle 104 for which power may be provided by electrical power system 100. Electrical power system 100 may provide power for vehicles other than aircraft 102. For example, without limitation, vehicle 104 may be any vehicle that is configured for travelling through the air, in space, on land, on the surface of water, underwater, or in any other operating environment or combination of environments.

Vehicle 104 is an example of platform 106 for which power may be provided by electrical power system 100. Electrical power system 100 may provide power for platforms other than vehicle 104. For example, without limitation, platform 106 may include any fixed or mobile platform.

Electrical power system 100 may include alternating current (AC) power system 108 and direct current (DC) power system 110. AC power system 108 and DC power system 110 may be referred to as subsystems of electrical power system 100.

AC power system 108 may be single phase 112 or multiple phase 114. For example, without limitation, AC power system 108 may be a three-phase power system. AC power system 108 may be configured to provide electrical power for various AC loads 116 on aircraft 102. AC loads 116 may be considered to be part of AC power system 108.

DC power system 110 may be configured to receive electrical power from AC power system 108. For example, a rectifier or other device may be configured to provide DC power for DC power system 110 from AC power provided by AC power system 108. DC power system 110 may be configured to provide electrical power for various DC loads 118 on aircraft 102. For example, without limitation, DC loads 118 may include various electric motors driven by motor controllers, other loads that use DC power, or various combinations of such loads. DC loads 118 may be considered to be part of DC power system 110.

Electrical power system 100 may be characterized by stability 126. Stability 126 may be defined by the ability of electrical power system 100 to retain or regain a normal state of equilibrium during normal operation and after being subjected to a disturbance. Electrical power system 100 that retains or regains a normal state of equilibrium may be characterized as stable 128. Electrical power system 100 that does not retain a normal state of equilibrium during normal operation or that does not regain a normal state of equilibrium after being subjected to a disturbance may be characterized as unstable 130. Stability 126 may refer to the stability of AC power system 108, DC power system 110, or both. In any case, it is desirable that electrical power system 100 on aircraft 102 is stable 128.

Figure 2:
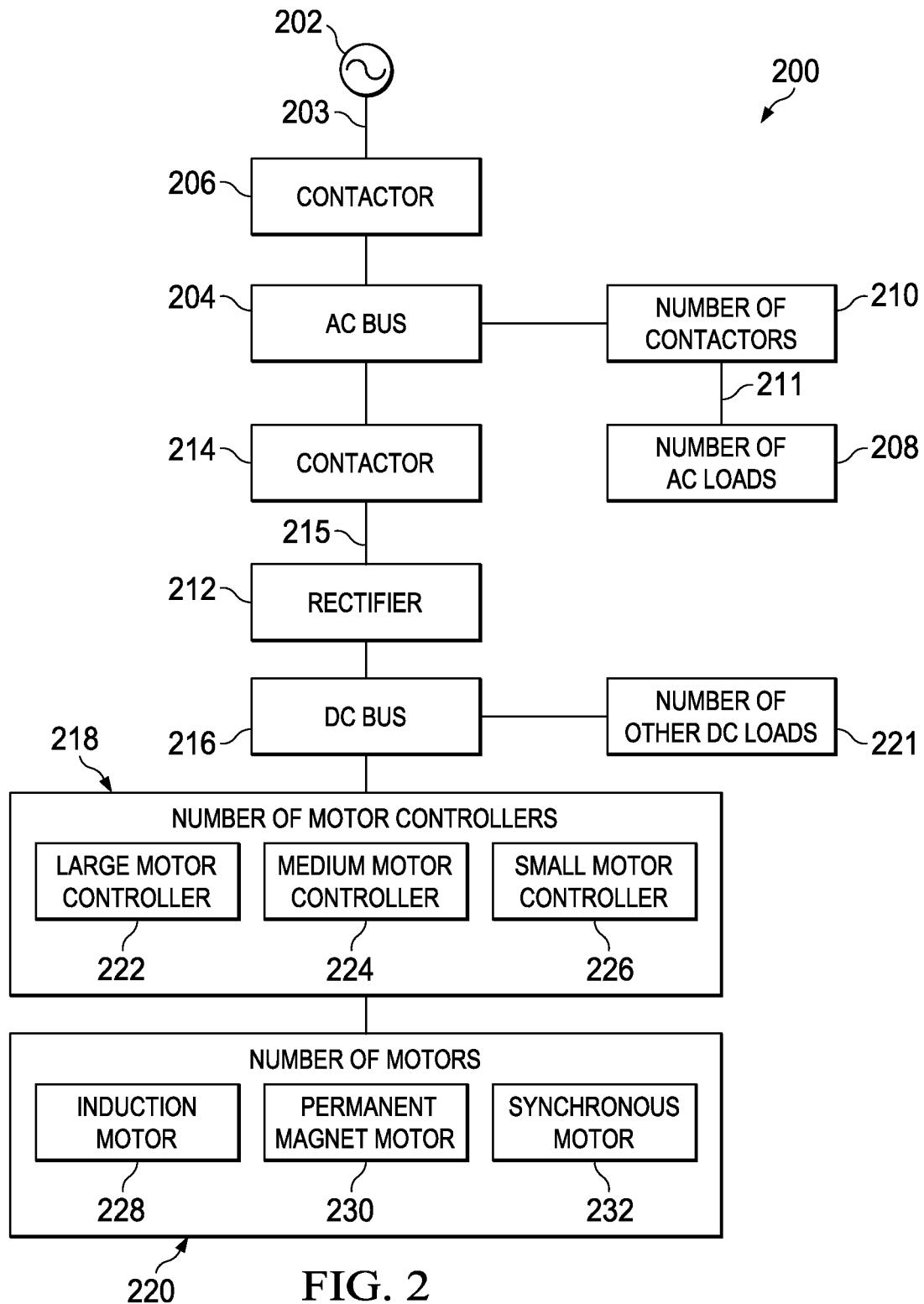
FIG. 2 is an illustration of a block diagram of an electrical power system in accordance with an illustrative embodiment.

Turning now to FIG. 2, an illustration of a block diagram of an electrical power system is depicted in accordance with an illustrative embodiment. In this example, electrical power system 200 may be an example of one implementation of electrical power system 100 on aircraft 102 in FIG. 1.

Electrical power system 200 may include generator 202. For example, generator 202 may be driven by an engine on an aircraft. For example, without limitation, generator 202 may generate variable frequency three-phase AC power or other AC power. Generator feeder lines 203 may carry the generated AC power from generator 202 to AC bus 204.

Contactor 206 may be provided on generator feeder lines 203. Contactor 206 may comprise any appropriate type of circuit breaker or other device that may be configured to disconnect AC bus 204 from generator 202 when contactor 206 is opened. Generator 202 may be connected to AC bus 204, to provide AC power to AC bus 204 on lines 203, when contactor 206 is closed.

AC bus 204 may be configured to distribute the AC power provided by generator 202 to various loads. For example, without limitation, AC bus 204 may be configured to distribute the AC power provided by generator 202 to number of AC loads 208. For example, number of AC loads 208 may include various loads on an aircraft that use AC electrical power.

Number of contactors 210 may be provided on load feeder lines 211 connecting AC bus 204 to number of AC loads 208. Number of contactors 210 may comprise any appropriate type of circuit breakers or other devices that may be configured to disconnect load feeder lines 211 and number of AC loads 208 from AC bus 204 when number of contactors 210 is opened. AC bus 204 may be connected to number of AC loads 208, to provide AC power to number of AC loads 208 on load feeder lines 211, when number of contactors 210 is closed.

AC bus 204 may be configured to distribute the AC power provided by generator 202 to rectifier 212. Rectifier 212 may be configured to convert the AC power provided by AC bus 204 to DC power. Rectifier 212 may comprise any appropriate device for converting AC power to DC power. For example, rectifier 212 may comprise any appropriate passive or active AC-to-DC rectification units.

Contactor 214 may be provided on feeder lines 215 connecting AC bus 204 to rectifier 212. Contactor 214 may comprise any appropriate type of circuit breaker or other device that may be configured to disconnect feeder lines 215 and rectifier 212 from AC bus 204 when contactor 214 is opened. AC bus 204 may be connected to rectifier 212 to provide AC power to rectifier 212 on feeder lines 215 when contactor 214 is closed.

DC power from rectifier 212 may be provided on DC bus 216. DC bus 216 may be configured to distribute DC power from rectifier 212 to various DC loads. For example, without limitation, such DC loads may include number of motor controllers 218, number of motors 220, number of other DC loads 221, or various combinations of loads that use DC power. For example, number of motor controllers 218, number of motors 220, and number of other DC loads 221 may comprise DC loads on an aircraft.

Number of motor controllers 218 may comprise any type of motor controllers that are appropriate for controlling number of motors 220. Number of motor controllers 218 may be of any appropriate size and complexity, depending on the types and sizes of number of motors 220 to be controlled. For example, number of motor controllers 218 may comprise solid state multifunctional motor controllers that provide power conversion for driving number of motors 220. Motor controllers of this type may be used to drive various types of motors and motor loads.

Number of motor controllers 218 may include various motor controllers that may be classified according to rated power levels. For example, without limitation, number of motor controllers 218 may include large motor controller 222, medium motor controller 224, small motor controller 226, or any combination of motor controllers classified for various rated power levels. For example, the rated power level of large motor controller 222 may be greater than approximately 40 kW or another appropriate power level. The rated power level of medium motor controller 224 may be between approximately 10 kW and approximately 40 kW or another appropriate range of power levels. The rated power level of small motor controller 226 may be less than approximately 10 kW or another appropriate power level. In any case, the rated power level of large motor controller 222 may be greater than the rated power level of medium motor controller 224 and the rated power level of medium motor controller 224 may be greater than the rated power level of small motor controller 226.

Number of motors 220 may include any types of electric motors that may be driven by number of motor controllers 218. For example, without limitation, number of motors 220 may include induction motor 228, permanent magnet motor 230, synchronous motor 232 with independent excitation, or any other type of electric motor. Number of motors 220 may include various numbers of the same or different types of motors.

In this example, the portion of electrical power system 200 comprising generator 202, AC bus 204, number of AC loads 208, and rectifier 212 may be an example of one implementation of AC power system 108 in FIG. 1. The portion of electrical power system 200 comprising rectifier 212, DC bus 216, number of motor controllers 218, number of motors 220, and number of other DC loads 221 may be an example of one implementation of DC power system 110 in FIG. 1.

Figure 3:
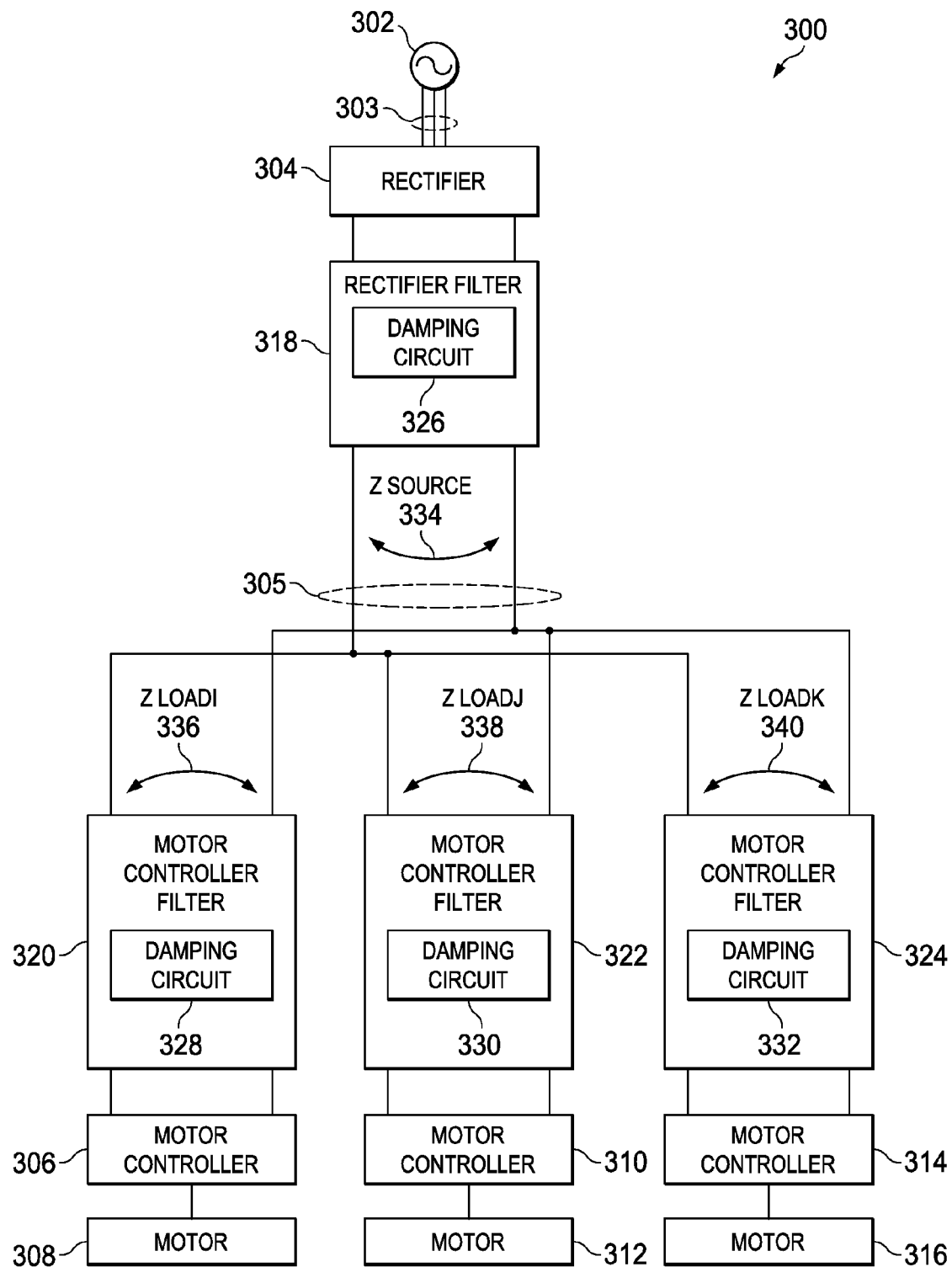
FIG. 3 is an illustration of a block diagram of a direct current electrical power system in accordance with an illustrative embodiment.

Turing now to FIG. 3, an illustration of a block diagram of a direct current electrical power system is depicted in accordance with an illustrative embodiment. In this example, DC power system 300 may be an example of one implementation of DC power system 110 in FIG. 1.

DC power system 300 may receive AC power from AC power system 302 on lines 303. AC power on lines 303 may be converted to DC power for DC power system 300 by rectifier 304. Rectifier 304 may comprise any appropriate device for converting AC power to DC power.

DC power from rectifier 304 may be provided on lines 305 to various DC loads in DC power system 300. For example, without limitation, the various DC loads in DC power system 300 may include motor controller 306 for controlling motor 308, motor controller 310 for controlling motor 312, and motor controller 314 for controlling motor 316. Motor controllers 306, 310, and 314 may comprise any motor controllers that are appropriate for controlling motors 308, 312, and 316, respectively. Motors 308, 312, and 316 may include any types of electric motors that may be driven by motor controllers 306, 310, and 312, respectively.

DC power system 300 may include filter circuits that are configured to attenuate voltage and current ripple in DC power system 300 to a desired level. For example, the maximum desired level of voltage and current ripple in DC power system 300 may be specified by system requirements for DC power system 300. Preferably, such filter circuits for a DC power system on an aircraft may be designed for stability while maintaining a desirable low weight and volume. For example, such filter circuits in DC power system 300 may include rectifier filter 318, motor controller filter 320, motor controller filter 322, and motor controller filter 324. Rectifier filter 318 may be implemented at the output of rectifier 304 to lines 305. Motor controller filters 320, 322, and 324 may be implemented at the inputs from lines 305 to motor controllers 306, 310, and 314, respectively.

Filter circuits for attenuating voltage and current ripple in DC power system 300 may include LC filters comprising inductors and capacitors connected together. LC filters may provide an acceptable level of attenuation of voltage and current ripples in DC power system 300. However, LC filters may create resonances at some frequencies. At these frequencies, LC filters may amplify ripple instead of attenuating it. Therefore, it may be desirable that LC filters used in DC power system 300 are designed so that any resonances are either located at frequencies at which ripple is not present, are very small, or both. In either case, amplification by the LC filters at the resonance frequencies may not create a problem. Alternatively, the resonances created by the use of LC filters in DC power system 300 may be eliminated or damped.

In accordance with an illustrative embodiment, resonances in the filters used for attenuating voltage and current ripple in DC power system 300 may be reduced or eliminated by the use of damping circuits. For example, rectifier filter 318 in DC power system 300 may include damping circuit 326, motor controller filter 320 may include damping circuit 328, motor controller filter 322 may include damping circuit 330, and motor controller filter 324 may include damping circuit 332. For example, without limitation, damping circuits 326, 328, 330, and 332 may comprise resistors connected in parallel with inductors, resistors connected in series with capacitors, or both. The resistors in damping circuits 326, 328, 330, and 332 allow for ripple energy that may be amplified at a resonance frequency by rectifier filter 318 or motor controller filters 320, 322, and 324 to be dissipated or converted to heat through Ohmic heating.

Rectifier 304 is the source of DC power in DC power system 300. In this example, source impedance 334, Zsource, of DC power system 300 may be determined at the output of rectifier 304. For example, source impedance 334 may include the impedance of rectifier filter 318.

Motor controllers 306, 310, and 314 and associated motors 308, 312, and 316 are loads in DC power system 300. In this example, load impedance 336, Zloadi, of DC power system 300 may be determined at the input to motor controller 306. Load impedance 338, Zloadj, of DC power system 300 may be determined at the input to motor controller 310. Load impedance 340, Zloadk, of DC power system 300 may be determined at the input to motor controller 314. For example, load impedances 336, 338, and 340 may include the impedances of motor controller filters 320, 322, and 324, respectively.

Middlebrook criterion may be used for stability analysis. The Middlebrook criterion states that if source impedance Zsource is sufficiently lower than load impedance Zload in an electrical power system, then the electrical power system is stable. The Middlebrook criterion should be met for all frequencies, for all load combinations, and for all operating modes of the electrical system loads to ensure electrical power system stability. However, in some complex electrical power systems, source and load impedances may intersect at some frequency points. For example, without limitation, an electrical power system that is optimally designed for weight and volume may not necessarily meet classical Middlebrook criterion. Therefore, a variation of the Middlebrook criterion based on Nyquist criterion may be used to evaluate the stability of an electrical power system in accordance with illustrative embodiments.

Figure 4:
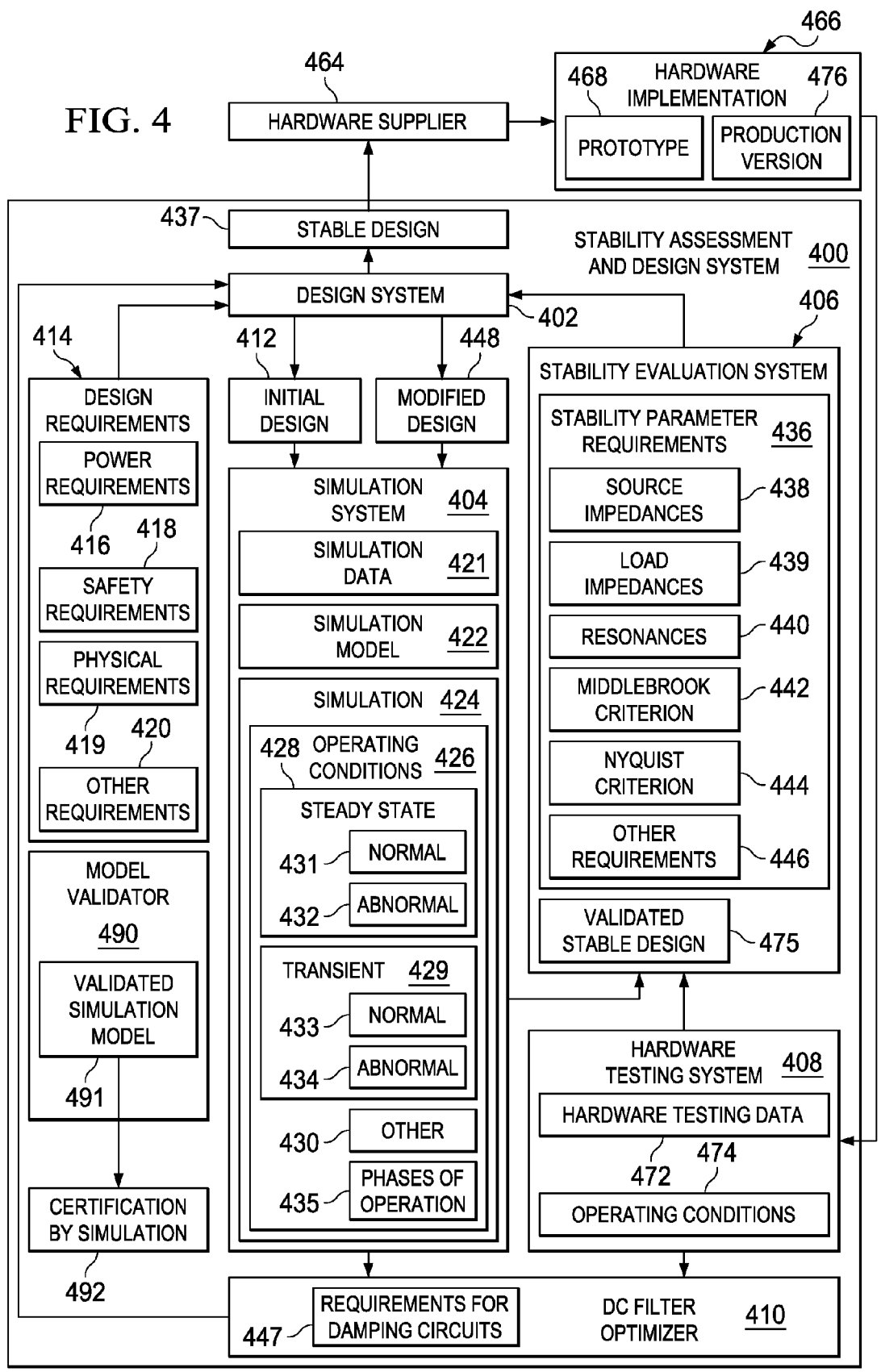
FIG. 4 is an illustration of a block diagram of a stability assessment and design system in accordance with an illustrative embodiment.

Turning now to FIG. 4, an illustration of a block diagram of a stability assessment and design system is depicted in accordance with an illustrative embodiment. In this example, stability assessment and design system 400 may be configured to design and assess stable 128 electrical power system 100 for aircraft 102 in FIG. 1. For example, without limitation, stability assessment and design system 400 may be configured to design and asses a stable three-phase AC power system equipped with DC power conversion equipment and active motor loads driven by motor controllers, such as electrical power system 200 in FIG. 2 including DC power system 300 in FIG. 3. Stability assessment and design system 400 may include design system 402, simulation system 404, stability evaluation system 406, hardware testing system 408, and DC filter optimizer 410.

Design system 402 may be configured for generating and modifying a design for an electrical power system. For example, design system 402 may comprise various computer implemented design tools that may be configured for designing electrical power systems. Design system 402 may include a number of human designers working in combination with or using such computer implemented design tools to create or modify designs for electrical power systems.

Design system 402 may be configured to establish initial design 412 for an electrical power system. Initial design 412 may satisfy various design requirements 414 for the electrical power system. Design requirements 414 also may be referred to as initial requirements for the electrical power system. Initial design 412 may satisfy design requirements 414 if initial design 412 for the electrical power system includes all of the components, structures, functions, capabilities, or other characteristics or combinations of characteristics for the electrical power system as may be specified in design requirements 414.

For example, without limitation, design requirements 414 may include power requirements 416, safety requirements 418, physical requirements 419, other requirements 420, or various combinations of requirements for the electrical power system. Power requirements 416 may specify the type, amount, quality, or other characteristics or combinations of characteristics of the power to be provided by the electrical power system. For example, without limitation, power requirements 416 may specify the power requirements for various loads that may be provided power by the electrical power system. Safety requirements 418 may specify requirements for safe operation of the electrical power system, requirements for safe operation of systems that are provided with power by the electrical power system, or both. For example, without limitation, safety requirements 418 may include requirements for redundancies in the electrical power system or other requirements or combinations of requirements related to the reliable operation of the electrical power system so that a system, such as an aircraft, that is provided with power by the electrical power system may be operated safely. Physical requirements 419 may specify requirements for the size, weight, arrangement of components, or other physical characteristics or combinations of various physical characteristics of the electrical power system. Other requirements 420 may include, for example, without limitation, requirements related to the effects of electromagnetic interference in the electrical power system, requirements related to stability in the electrical power system, or other required or desirable characteristics or combinations of characteristics of the electrical power system.

For example, without limitation, design system 402 may be configured to establish initial design 412 for an electrical power system comprising a DC power system. In this case, design system 402 may be configured to establish initial design 412 for the electrical power system such that DC loads are allocated to the DC power system in an appropriate manner in initial design 412, as may be specified by design requirements 414 for the electrical power system.

Initial design 412 for an electrical power system may be relatively complex. Even though initial design 412 may satisfy design requirements 414, the stability of the electrical power system defined by initial design 412 may not be established. In particular, the stability of the electrical power system defined by initial design 412 may not be established for a variety of different operating conditions in which the electrical power system may be operated.

Simulation system 404 may be configured to simulate initial design 412 for an electrical power system to generate simulation data 421. For example, simulation system 404 may be configured to establish simulation model 422 for initial design 412. Simulation system 404 may be configured to run simulation 424 of initial design 412 using simulation model 422 to generate simulation data 421.

Various functions of simulation system 404 may be implemented using commercially available simulation software. For example, without limitation, various functions of simulation system 404 may be implemented using Simulink\MATLAB software with the use of SimPowerSystems toolbox or any other appropriate simulation software. MATLAB with SimPowerSystems toolbox offers several different solvers and is a commonly used software tool for time-domain simulations of different switching power converter circuits.

Simulation 424 may be run for various operating conditions 426 of the electrical power system. For example, simulation 424 may be run for various steady state 428 operating conditions 426, for various transient 429 operating conditions 426, and for any other 430 appropriate operating conditions 426. Simulation 424 may be run for normal 431 and abnormal 432 steady state 428 operating conditions 426. Simulation 424 may be run for normal 433 and abnormal 434 transient 429 operating conditions 426. Operating conditions 426 may be considered to be normal 431 and/or 433 when an electrical power system operates under no failure conditions. In other words, operating conditions 426 may be considered to be normal 431 and/or 433 when there is no failure in the electrical power system. Operating conditions may be considered to be abnormal 432 and/or 434 when there is a failure in the power system.

Simulation 424 may be run for various phases of operation 435 of the aircraft or other vehicle in which the electrical power system will be used. For example, without limitation, phases of operation 435 of an aircraft may include ground operations, taxiing, takeoff, climb, cruise, descent, landing, or other phases of flight or other operations of the aircraft. Steady state 428, transient 429, and other 430 operating conditions 426 may be different for different phases of operation 435 of an aircraft or other vehicle. Therefore, simulation 424 may be run for steady state 428, transient 429, and any other 430 appropriate operating conditions 426 at a number of various different phases of operation 435 of an aircraft or other vehicle in which the electrical power system will be used.

Simulation data 421 may comprise an appropriate portion of the results of simulation 424 of an electrical power system. Simulation data 421 may be provided from simulation system 404 to stability evaluation system 406 for evaluation in any appropriate form or manner.

Stability evaluation system 406 may be configured to evaluate the stability of an electrical power system from simulation data 421. For example, stability evaluation system 406 may be configured to establish stability parameter requirements 436 for stable design 437 for an electrical power system from simulation data 421. Stability parameter requirements 436 may include requirements for any appropriate characteristics of an electrical power system such that an electrical power system that satisfies stability parameter requirements 436 is considered a stable electrical power system.

For example, without limitation, stability parameter requirements 436 may include requirements for source impedances 438, load impedances 439, resonances 440, Middlebrook criterion 442, Nyquist criterion 444, other requirements 446, or various combinations of requirements for a stable electrical power system. For example, without limitation, stability parameter requirements 436 for source impedances 438 may comprise source impedance magnitude limits, source impedance phase boundaries, or other appropriate source impedance requirements or combinations of source impedance requirements for a stable electrical power system. Stability parameter requirements 436 for resonances 440 may comprise requirements for damping circuits 447 to reduce resonances 440 in a stable electrical power system to acceptable levels. For example, requirements for damping circuits 447 may be provided by DC filter optimizer 410.

Stable design 437 is a design for an electrical power system that satisfies stability parameter requirements 436 within appropriate tolerances. For example, without limitation, stability parameter requirements 436 established by stability evaluation system 406 may be provided to design system 402. Design system 402 then may be used to establish stable design 437 for an electrical power system that satisfies stability parameter requirements 436. Design system 402 also may be configured to ensure that stable design 437 also satisfies design requirements 414.

Design system 402 may be configured to establish stable design 437 for an electrical power system by modifying initial design 412 for the electrical power system as appropriate to satisfy stability parameter requirements 436. For example, design system 402 may be configured to use stability parameter requirements 436 to modify initial design 412 for an electrical power system to establish modified design 448 for the electrical power system. Modified design 448 may then be simulated by simulation system 404 as described above to generate simulation data 421. Simulation data 421 for modified design 448 may be evaluated by stability evaluation system 406 to determine whether or not modified design 448 satisfies stability parameter requirements 436. Modified design 448 may be determined to satisfy stability parameter requirements 436 when simulation 424 of modified design 448 indicates that the relevant parameters of operation of modified design 448 for simulated operating conditions 426 match stability parameter requirements 436 within appropriate tolerances. This process may be repeated until stability evaluation system 406 determines that stable design 437 for an electrical power system has been established.

Stable design 437 for an electrical power system may be provided to hardware supplier 464 or another appropriate entity for the production of hardware implementation 466 of the electrical power system. Hardware implementation 466 may be produced by hardware supplier 464 or another appropriate entity to implement the electrical power system defined by stable design 437 using appropriate hardware. For example, without limitation, hardware implementation 466 may comprise prototype 468 of stable design 437 for an electrical power system implemented in hardware. Hardware implementation 466 may comprise an implementation in hardware of any appropriate portion of the electrical power system defined by stable design 437.

Hardware testing system 408 may be configured to test hardware implementation 466 of stable design 437 for an electrical power system to generate hardware testing data 472. For example, hardware testing system 408 may be configured to perform a system integration test of hardware implementation 466 for various operating conditions 474 of an electrical power system to generate hardware testing data 472. For example, without limitation, operating conditions 474 for which hardware implementation 466 of an electrical power system may be tested by hardware testing system 408 may correspond to all or some of operating conditions 426 for the electrical power system that were simulated in simulation system 404 for simulation 424 of the electrical power system.

Hardware testing data 472 may comprise any appropriate portion of the results of testing performed by hardware testing system 408 on hardware implementation 466 of an electrical power system. Hardware testing data 472 for hardware implementation 466 of an electrical power system may be generated by hardware testing system 408 and provided to stability evaluation system 406 in any appropriate form or manner.

Stability evaluation system 406 may be configured to use hardware testing data 472 from hardware testing system 408 to verify the stability of the electrical power system as defined by stable design 437 and as implemented in hardware implementation 466. For example, stability evaluation system 406 may be configured to validate stable design 437 for an electrical power system by determining whether hardware testing data 472 for the testing of hardware implementation 466 indicates that hardware implementation 466 of stable design 437 satisfies stability parameter requirements 436. Stability evaluation system 406 also may be configured to determine whether hardware testing data 472 for the testing of hardware implementation 466 indicates that hardware implementation 466 of stable design 437 satisfies design requirements 414.

Stable design 437 may be modified in response to a determination by stability evaluation system 406 that hardware testing data 472 for the testing of hardware implementation 466 of stable design 437 indicates that stable design 437 does not satisfy either design requirements 414 or stability parameter requirements 436. In this case, design system 402 may be used to modify stable design 437 as appropriate. After appropriate modification, stable design 437 may be simulated by simulation system 404 and hardware implementation 466 of the modified stable design 437 may be tested by the hardware testing system in the manner described above. This process may be repeated until stability evaluation system 406 determines that both simulation data 421 from simulation 424 of stable design 437 and hardware testing data 472 from the testing of hardware implementation 466 of stable design 437 indicates that stable design 437 satisfies both design requirements 414 and stability parameter requirements 436.

Stability evaluation system 406 may be configured to establish validated stable design 475 for an electrical power system in response to a determination that hardware testing data 472 indicates that hardware implementation 466 of stable design 437 satisfies design requirements 414 and stability parameter requirements 436. Stable design 437 may be determined to satisfy stability parameter requirements 436 when hardware testing data 472 indicates that the relevant parameters of the operation of hardware implementation 466 of stable design 437 for operating conditions 474 match stability parameter requirements 436 within appropriate tolerances. The stability of validated stable design 475 for an electrical power system is, thus, confirmed for various operating conditions of the electrical power system by both simulation and hardware testing.

Validated stable design 475 may be provided to hardware supplier 464 or another appropriate entity for the production of production version 476 of an electrical power system. Production version 476 of an electrical power system may comprise hardware implementation 466 of the electrical power system defined by validated stable design 475. Production version 476 may be produced by hardware supplier 464 or another appropriate entity using appropriate hardware as may be defined by validated stable design 475. Production version 476 of an electrical power system is a stable electrical power system that may be used to provide electrical power for an aircraft or other appropriate vehicle or platform.

Correcting an undesired instability in hardware implementation 466 of an electrical power system may be relatively expensive. In particular, correcting an undesired instability that may be identified in production version 476 of an electrical power system may be relatively very expensive. In accordance with an illustrative embodiment, however, stability parameter requirements 436 for stable design 437 for an electrical power system may be established and confirmed by simulation of the electrical power system for various operating conditions 426.

Therefore, the likelihood that hardware implementation 466 of stable design 437 for the electrical power system will include undesired instabilities is reduced. Furthermore, the stability of validated stable design 475 for an electrical power system may be confirmed by both simulation and hardware testing before production version 476 of the electrical power system defined by validated stable design 475 is produced. Therefore, undesired instabilities in production version 476 of an electrical power system may be reduced or eliminated in accordance with an illustrative embodiment.

DC filter optimizer 410 may be configured to establish requirements for damping circuits 447 for stable design 437 for an electrical power system. For example, DC filter optimizer 410 may be configured to establish requirements for damping circuits 447 to optimize the DC filters used in the DC power system portion of an electrical power system defined by stable design 437. Requirements for damping circuits 447 may be configured to reduce or eliminate resonances in such DC filters.

Requirements for damping circuits 447 for an electrical power system may be established and confirmed by DC filter optimizer 410 using simulation data 421 from simulation 424 of the electrical power system by simulation system 404, using hardware testing data 472 from testing of hardware implementation 466 of the electrical power system by hardware testing system 408, or using both simulation data 421 and hardware testing data 472. Requirements for damping circuits 447 established by DC filter optimizer 410 may comprise part of stability parameter requirements 436 for stable design 437.

Stability assessment and design system 400 may include model validator 490. Model validator 490 may be configured to establish validated simulation model 491 of an electrical power system. For example, model validator 490 may be configured to establish validated simulation model 491 for validated stable design 475 for an electrical power system. Model validator 490 may be configured to confirm that hardware implementation 466 of validated stable design 475 for the electrical power system and validated simulation model 491 of validated stable design 475 for the electrical power system are equivalent and that validated simulation model 491 of the electrical power system is logically complete.

Validated simulation model 491 may be used for certification by simulation 492. For example, stability assessment and design system 400 may be configured to provide certification by simulation 492 using validated simulation model 491. Certification by simulation 492 may be used, for example, to certify any changes to a design for an electrical power system before such changes are implemented in an electrical power system in use on an aircraft or other platform. Such certification is now typically performed by hardware testing. Hardware testing may be relatively time consuming and expensive. Certification by simulation 492 using validated simulation model 491 may be significantly less expensive and time consuming than certification by hardware testing.

The illustration of FIG. 4 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 5:
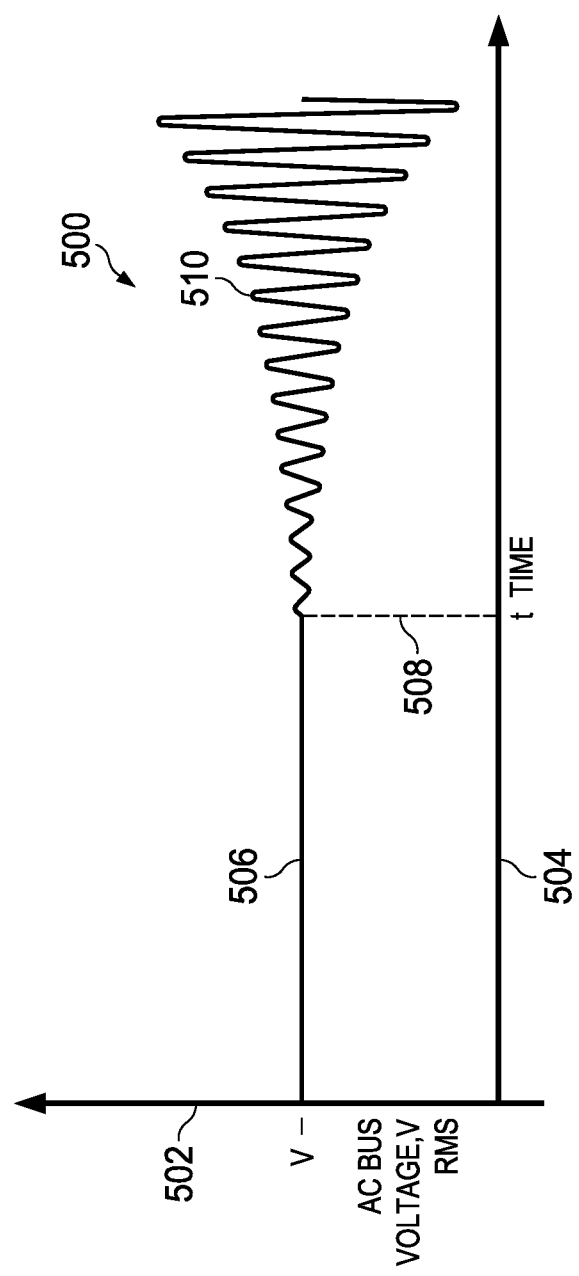
FIG. 5 is an illustration of a waveform diagram of bus voltage in an unstable electrical power system.

Turning now to FIG. 5, an illustration of a waveform diagram of bus voltage in an unstable electrical power system is depicted. In this example, waveform 500 illustrates root mean square AC bus voltage over time in an electrical power system. The magnitude of root mean square AC bus voltage is indicated on vertical axis 502. Time is indicated on horizontal axis 504.

In this example, the AC bus voltage is locally stable around steady state equilibrium voltage level V 506 prior to time t 508. The AC bus voltage may become unstable when the electrical power system is subjected to an event at time t 508 that may trigger transition of the electrical power system into an unstable region of operation 510. Such an event may be transient in nature. For example, without limitation, events that may trigger such a transition to an unstable region of operation may include application or removal of active or passive loads on either AC or DC busses in the electrical power system, sudden changes in AC bus frequency, power system reconfigurations with subsequent changes in loading due to power transfers, or other events or combinations of events occurring in the electrical power system. Such events may be normal or abnormal. Normal events may be the result of normal operation of the electrical power system. Abnormal events may be the result of operation of the electrical power system under failure conditions.

Unstable operation of an electrical power system may lead to damage of electrical power system equipment, protective shutdown of the electrical power system, or both. Illustrative embodiments provide a system and method for designing and evaluating an electrical power system to ensure that the power system is stable under all possible normal and abnormal operating conditions.

Figure 6:
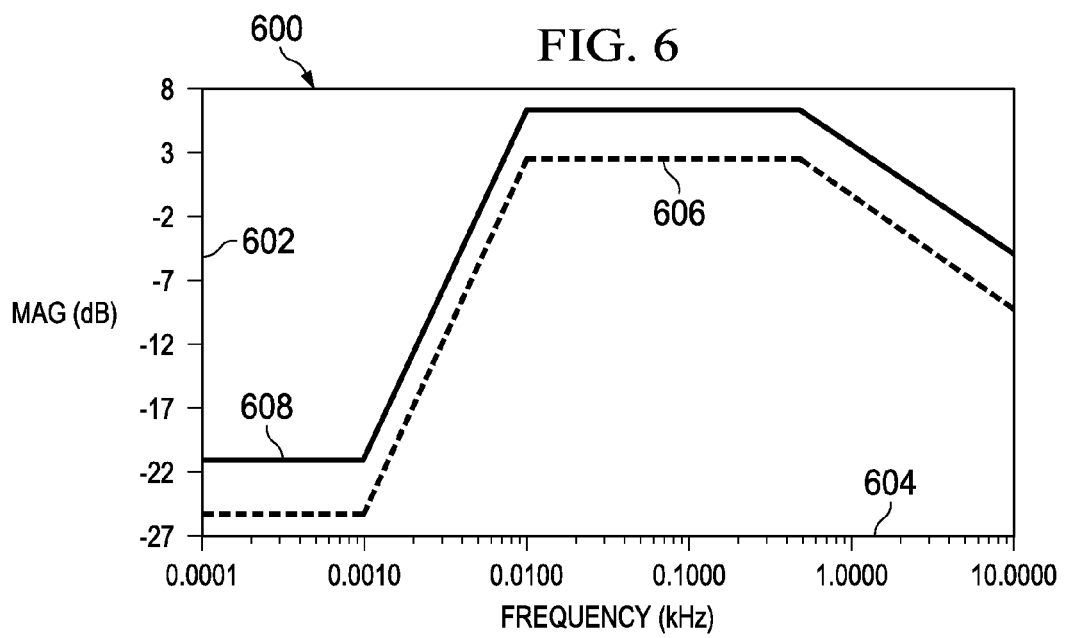
FIG. 6 is an illustration of source impedance magnitude limits for a stable electrical power system in accordance with an illustrative embodiment.

Turning now to FIG. 6, an illustration of source impedance magnitude limits for a stable electrical power system is depicted in accordance with an illustrative embodiment. In this example, source impedance magnitude limits 600 are illustrated with magnitude in decibels on vertical axis 602 and frequency in kilohertz on horizontal axis 604. Minimum source impedance magnitude is shown as line 606. Maximum source impedance magnitude is shown as line 608.

Figure 7:
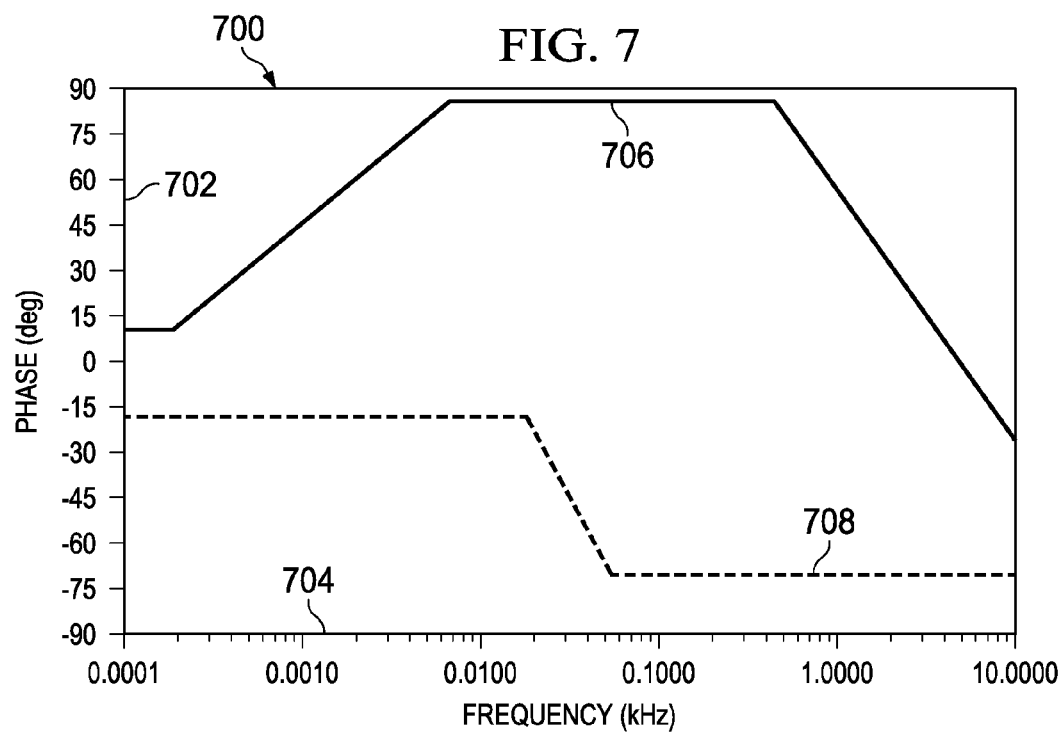
FIG. 7 is an illustration of source impedance phase boundaries for an electrical power system in accordance with an illustrative embodiment.

Turning now to FIG. 7, an illustration of source impedance phase boundaries for an electrical power system is depicted in accordance with an illustrative embodiment. In this example, source impedance phase boundaries 700 are illustrated with phase in degrees on vertical axis 702 and frequency in kilohertz on horizontal axis 704. Maximum source impedance phase is shown as line 706. Minimum source impedance phase is shown at line 708.

Figure 8:
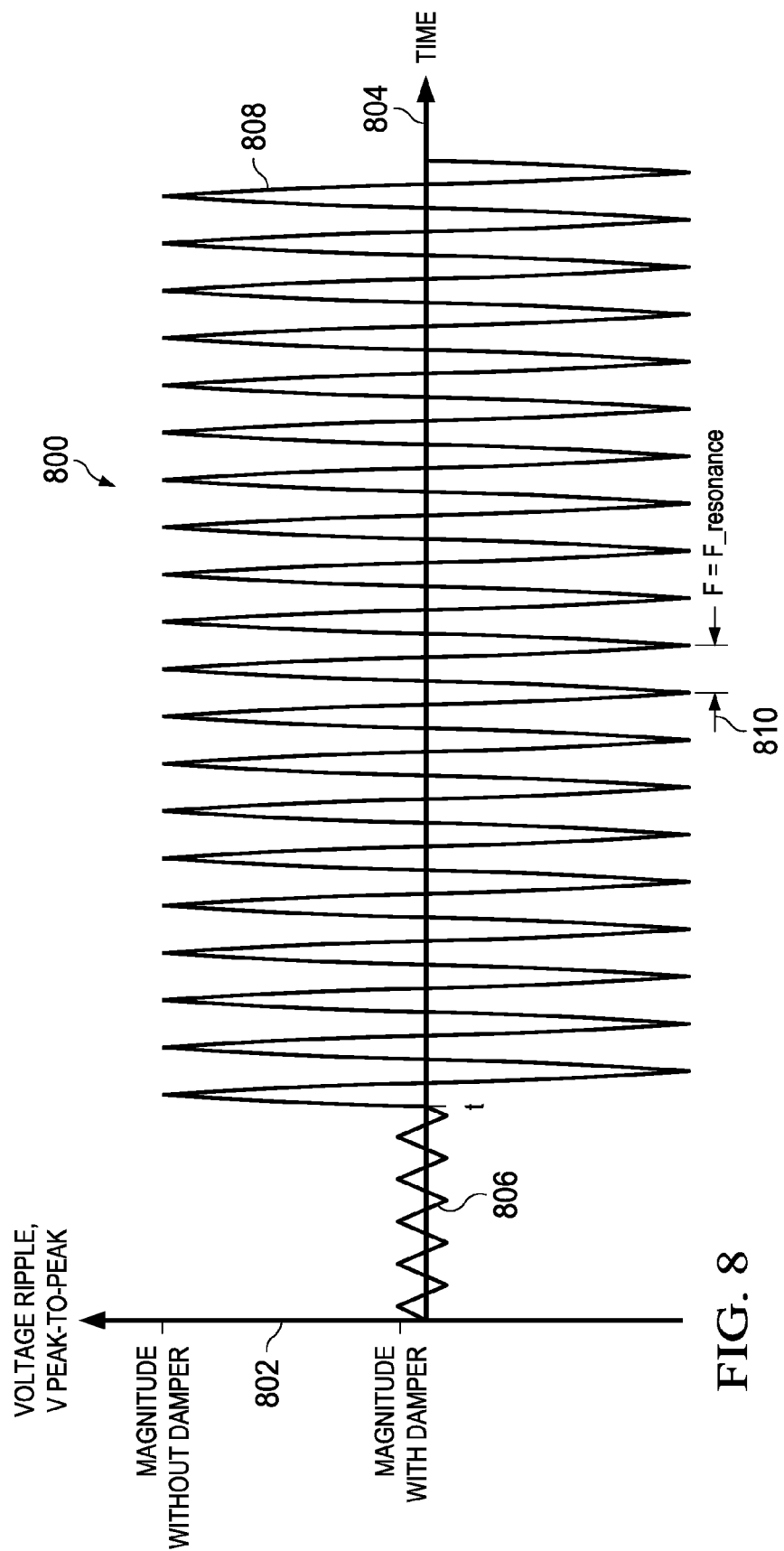
FIG. 8 is an illustration of a waveform diagram of bus ripple voltage in an electrical power system.

Turning now to FIG. 8, an illustration of a waveform diagram of bus ripple voltage in an electrical power system is depicted in accordance with an illustrative embodiment. In this example, waveform 800 is illustrated with voltage on vertical axis 802 and time on horizontal axis 804. Portion 806 of waveform 800 shows voltage ripple with a damper circuit in use. Portion 808 of waveform 800 shows voltage ripple when a damper circuit is not used. In this example, the voltage ripple is caused by a resonance frequency corresponding to period 810 of the voltage ripple.

Figure 9:
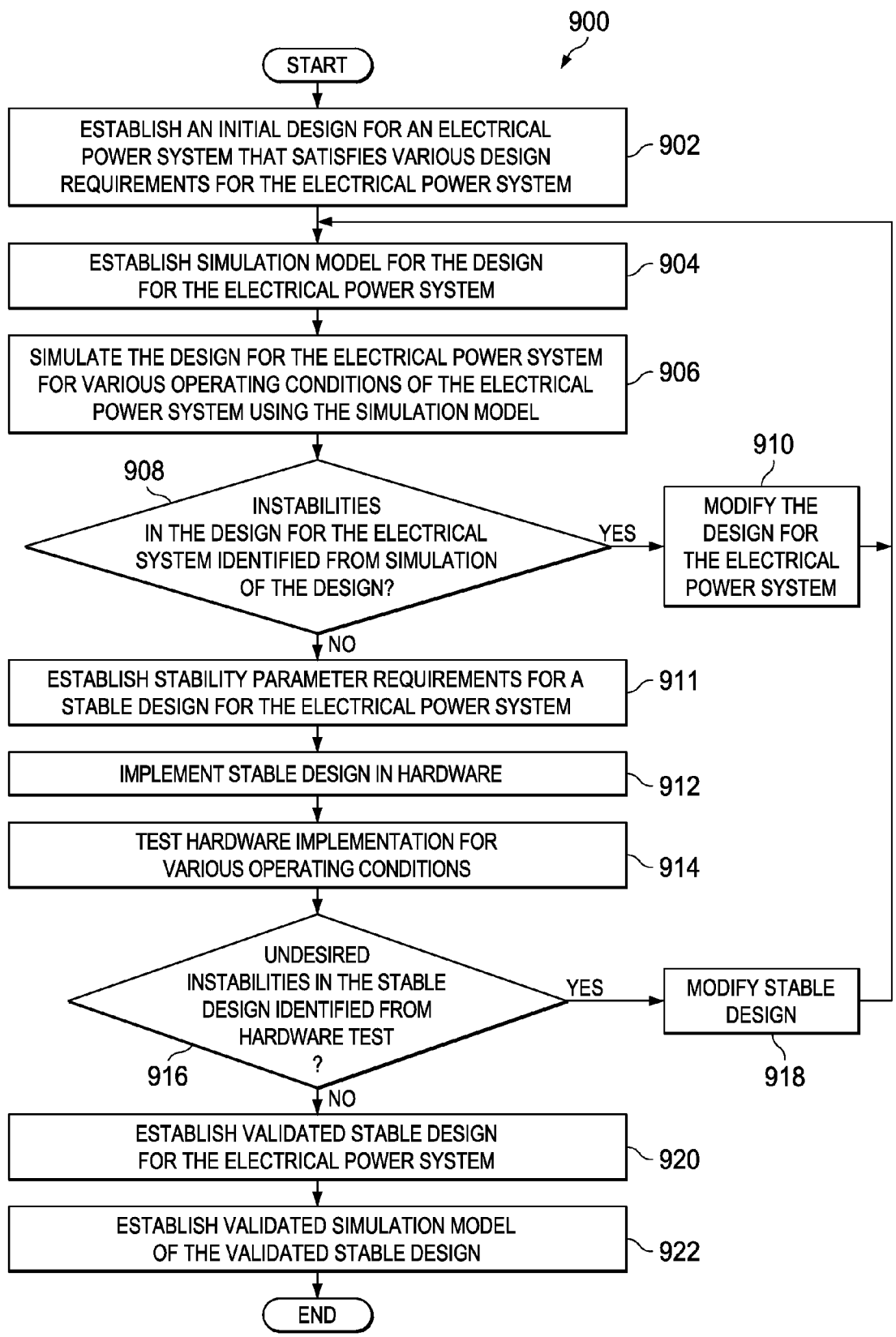
FIG. 9 is an illustration of a flowchart of a process for the design and assessment of the stability of an electrical power system in accordance with an illustrative embodiment.

Turning now to FIG. 9, an illustration of a flowchart of a process for the design and assessment of the stability of an electrical power system is depicted in accordance with an illustrative embodiment. For example, process 900 may be implemented in stability assessment and design system 400 in FIG. 4.

Process 900 may begin by establishing an initial design for an electrical power system that satisfies various design requirements for the electrical power system (operation 902). The initial design for the electrical power system may be established using an appropriate design system. For example, without limitation, the design requirements for the initial design for the electrical power system may comprise power requirements, safety requirements, physical requirements, or other appropriate requirements or combinations of requirements for the electrical power system. The initial design for the electrical power system may be relatively complex. Even though the initial design for the electrical power system may satisfy various design requirements, the stability of the electrical power system defined by the initial design may not be established. In particular, the stability of the electrical power system defined by the initial design may not be established for a variety of different operating conditions in which the electrical power system may be operated.

A simulation model of the initial design for the electrical power system may be established (operation 904). The initial design for the electrical power system then may be simulated for various operating conditions of the electrical power system using the simulation model (operation 906).

Operation 904 and operation 906 may be performed using an appropriate simulation system. For example, the initial design for the electrical power system may be simulated for various combinations of steady state, transient, normal, and abnormal operating conditions. The initial design for the electrical power system may be simulated for various operating conditions corresponding to various phases of operation of an aircraft or other platform in which the electrical power system may be used.

It then may be determined whether any undesired instabilities in the initial design for the electrical power system are identified from the simulation of the initial design for the electrical power system (operation 908). If instabilities in the initial design for the electrical power system are identified from the simulation, the initial design for the electrical power system may be modified (operation 910). For example, the initial design for the electrical power system may be modified using the appropriate design system. Operations 904, 906, 908, and 910 then may be repeated until no undesired instabilities in the design for the electrical power system are identified from the simulation of the design for the electrical power system.

When no undesired instabilities in the design for an electrical power system are identified from the simulation of the design for the electrical power system, stability parameter requirements for a stable design for the electrical power system may be established (operation 911). For example, the stability parameter requirements for the stable design for the electrical power system may be established from the simulation of the design for the electrical power system. The stability parameter requirements may include requirements for any appropriate characteristics of an electrical power system such that an electrical power system that satisfies the stability parameter requirements is considered a stable electrical power system.

For example, without limitation, the stability parameter requirements may include requirements for source impedances, load impedances, resonances, Middlebrook criterion, Nyquist criterion, other requirements, or various combinations of requirements for a stable electrical power system. The stable design for an electrical power system is a design for an electrical power system that satisfies the stability parameter requirements within appropriate tolerances. The stable design for the electrical power system also may satisfy the design requirements for the electrical power system.

The stable design for the electrical power system then may be implemented in hardware (operation 912). The hardware implementation of the stable design for the electrical power system then may be tested for various operating conditions of the electrical power system (operation 914). The testing of the hardware implementation of the stable design for the electrical power system may be performed by an appropriate hardware testing system. For example, without limitation, the operating conditions for which the hardware implementation the electrical power system may be tested in operation 914 may correspond to all or some of operating conditions for the electrical power system that were simulated for the simulation of the electrical power system in operation 906.

It then may be determined whether any undesired instabilities in the stable design for the electrical power system are identified from the testing of the hardware implementation of the stable design (operation 916). If any undesired instabilities in the stable design for the electrical power system are identified from the testing of the hardware implementation, the stable design may be modified (operation 918). Operations 904, 906, 908, 911, 912, 914, and 916 then may be repeated until it is determined that no undesired instabilities in the stable design for the electrical power system are identified from the testing of the hardware implementation of the stable design.

When no undesired instabilities in the stable design for the electrical power system are identified from the testing of the hardware implementation of the stable design, a validated stable design for the electrical power system may be established (operation 920). For example, the validated stable design for the electrical power system may be established in response to a determination that the testing of the hardware implementation of the stable design indicates that the stable design for the electrical power system satisfies the design requirements for the electrical power system and the stability parameter requirements for the electrical power system. The validated stable design for the electrical power system may be used to produce a production version of a stable electrical power system that may be used to provide electrical power for an aircraft or other appropriate vehicle or platform.

A validated simulation model of the validated stable design for the electrical power system may be established (operation 922), with the process terminating thereafter. Operation 922 may include confirming that the validated stable design for the electrical power system and the validated simulation model for the electrical power system are equivalent and that the validated simulation model of the electrical power system is logically complete. The validated simulation model of the validated stable design for the electrical power system may be used for certification by simulation of changes to the design for the electrical power system before such changes are implemented in an electrical power system in use on an aircraft or other vehicle. Certification by simulation using the validated simulation model may be less expensive and time consuming than conventional certification by hardware testing.

Turning now to FIG. 10, an illustration of a block diagram of a data processing system is depicted in accordance with an illustrative embodiment. In this example, data processing system 1000 is an example of one implementation of a data processing system for implementing stability assessment and design system 400 in FIG. 4.

In this illustrative example, data processing system 1000 includes communications fabric 1002. Communications fabric 1002 provides communications between processor unit 1004, memory 1006, persistent storage 1008, communications unit 1010, input/output (I/O) unit 1012, and display 1014. Memory 1006, persistent storage 1008, communications unit 1010, input/output (I/O) unit 1012, and display 1014 are examples of resources accessible by processor unit 1004 via communications fabric 1002.

Processor unit 1004 serves to run instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and other suitable information either on a temporary basis or a permanent basis. Storage devices 1016 also may be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code. As one example, data processing system 1000 may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or both transmit and receive data. Communications unit 1010 may be, for example, a modem or a network adapter, two network adapters, or some combination thereof. Further, a memory may be, for example, memory 1006, or a cache, such as that found in an interface and memory controller hub that may be present in communications fabric 1002.

Illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment.

During pre-production, aircraft manufacturing and service method 1100 may include specification and design 1102 of aircraft 1200 in FIG. 12 and material procurement 1104. During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112.

While in service by a customer, aircraft 1200 in FIG. 12 may be scheduled for routine maintenance and service 1114, which may include modification, reconfiguration, refurbishment, and other maintenance or service. In this example, aircraft manufacturing and service method 1100 is shown as a method for aerospace vehicles, including manned and unmanned aircraft. The different illustrative embodiments may be applied to other types of manufacturing and service methods, including manufacturing and service methods for other types of platforms, including other types of vehicles.

Each of the processes of aircraft manufacturing and service method 1100 may be performed or carried out by a system integrator, a third party, an operator, or by any combination of such entities. In these examples, the operator may be a customer. For the purposes of this description, a system integrator may include, without limitation, any number of aerospace vehicle manufacturers and major-system subcontractors; a third party may include, without limitation, any number of venders, subcontractors, and suppliers; and an operator may be a company, a military entity, a service organization, and so on.

With reference now to FIG. 12, an illustration of a block diagram of an aircraft in which an illustrative embodiment may be implemented is depicted. In this illustrative example, aircraft 1200 may be produced by aircraft manufacturing and service method 1100 in FIG. 11. Aircraft 1200 may include an aircraft, a spacecraft, or any other aerospace vehicle configured for traveling through the air, for traveling through space, or which is capable of operation in both air and space. Aircraft 1200 may include airframe 1202 with systems 1204 and interior 1206. Examples of systems 1204 include one or more of propulsion system 1208, electrical power system 1210, hydraulic system 1212, and environmental system 1214.

Apparatuses and methods embodied herein may be employed during at least one of the stages of aircraft manufacturing and service method 1100 in FIG. 11. As used herein, the phrase "at least one of," when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. The item may be a particular object, thing, or a category. In other words, at least one of means any combination of items and number of items may be used from the list but not all of the items in the list are required.

In one illustrative example, components or subassemblies produced in component and subassembly manufacturing 1106 in FIG. 11 may be fabricated or manufactured in a manner similar to components or subassemblies produced while aircraft 1200 in FIG. 12 is in service 1112 in FIG. 11.

As yet another example, a number of apparatus embodiments, method embodiments, or a combination thereof may be utilized during production stages, such as component and subassembly manufacturing 1106 and system integration 1108 in FIG. 11. "A number," when referring to items, means one or more items. For example, "a number of apparatus embodiments" is one or more apparatus embodiments. A number of apparatus embodiments, method embodiments, or a combination thereof may be utilized while aircraft 1200 is in service 1112, during maintenance and service 1114, or both.

For example, illustrative embodiments may be used to design and asses a stable electrical power system 1210 for aircraft 1200. Illustrative embodiments also may be used to create and validate a simulation model for electrical power system 1210. Illustrative embodiments may use such a validated simulation model to certify changes to the design of electrical power system 1210 before such changes are implemented on aircraft 1200.

The use of a number of the different illustrative embodiments may substantially expedite the assembly of aircraft 1200. A number of the different illustrative embodiments may reduce the cost of aircraft 1200. For example, one or more of the different illustrative embodiments may be used during specification and design 1102 or during other production stages. The different illustrative embodiments may be used during various parts of aircraft manufacturing and service method 1100 to design and assess a stable electrical power system 1210 for aircraft 1200. The different illustrative embodiments also may be used during various parts of aircraft manufacturing and service method 1100 to certify changes to the design of electrical power system 1210 for aircraft 1200 by simulation using a validated simulation model of electrical power system 1210.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions.

It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a design system having a processor coupled to a memory and configured to establish an initial design for an electrical power system, wherein the initial design for the electrical power system identifies and establishes design requirements for the electrical power system;
a simulation system in communication with the design system and configured to simulate the initial design for the electrical power system for a plurality of simulated operating conditions for the electrical power system to generate simulation data;
a stability evaluation system configured to receive the simulation data and to generate therefrom stability parameter requirements for a stable design for the electrical power system from the simulation data; and
a hardware testing system in communication with the stability evaluation system and configured to use the stability parameter requirements to test a hardware implementation of the stable design for the electrical power system, and to generate hardware testing data, wherein the stability evaluation system is configured to receive and use the hardware testing data to validate the stable design against the design requirements for the electrical power system to establish a validated stable design for the electrical power system.

2. The apparatus of claim 1, wherein:
the design system is configured to establish the stable design for the electrical power system comprising the stability parameter requirements.

3. The apparatus of claim 1, wherein:
the design requirements for the electrical power system are selected from power requirements for the electrical power system, safety requirements for the electrical power system, and physical requirements for the electrical power system; and
the stability parameter requirements comprise requirements for parameters of the electrical power system selected from Middlebrook criterion, Nyquist criterion, source impedances, load impedances, and resonances.

4. The apparatus of claim 1, wherein the plurality of simulated operating conditions for the electrical power system comprise steady state operating conditions for the electrical power system and transient operating conditions for the electrical power system.

5. The apparatus of claim 4, wherein the plurality of simulated operating conditions for the electrical power system comprise simulated normal operating conditions for the electrical power system and simulated abnormal operating conditions for the electrical power system.

6. The apparatus of claim 1, wherein the hardware testing system is configured to test the hardware implementation of the stable design for the electrical power system for a plurality of operating conditions for the electrical power system corresponding to the plurality of simulated operating conditions for the electrical power system to generate the hardware testing data.

7. The apparatus of claim 1 further comprising a DC filter optimizer configured to establish requirements for damping circuits for the stable design for the electrical power system to reduce resonances in DC filters in the electrical power system.

8. The apparatus of claim 1 further comprising a model validator configured to establish a validated simulation model of the validated stable design for the electrical power system.

9. The apparatus of claim 1, wherein the electrical power system is the electrical power system for an aircraft.

10. A method for establishing a validated stable design for a stable electrical power system, comprising:
establishing, using a design system having a processor coupled to a memory, an initial design for an electrical power system, wherein the initial design for the electrical power system identifies and establishes design requirements for the electrical power system;
simulating, using a simulation system in communication with the design system, the initial design for the electrical power system for a plurality of simulated operating conditions for the electrical power system to generate simulation data;
establishing, using a stability evaluation system, stability parameter requirements for a stable design for the electrical power system from the simulation data;
testing, using a hardware testing system, a hardware implementation using the stability parameter requirements of the stable design for the electrical power system to generate hardware testing data; and
validating, using the hardware testing system, the stable design against the design requirements for the electrical power system using the hardware testing data to establish a validated stable design for the electrical power system.

11. The method of claim 10, wherein the design requirements for the electrical power system are selected from power requirements for the electrical power system, safety requirements for the electrical power system, and physical requirements for the electrical power system.

12. The method of claim 10, wherein the stability parameter requirements comprise requirements for parameters of the electrical power system selected from Middlebrook criterion, Nyquist criterion, source impedances, load impedances, and resonances.

13. The method of claim 10, wherein the plurality of simulated operating conditions for the electrical power system comprise simulated steady state operating conditions for the electrical power system and simulated transient operating conditions for the electrical power system.

14. The method of claim 13, wherein the plurality of simulated operating conditions for the electrical power system comprise simulated normal operating conditions for the electrical power system and simulated abnormal operating conditions for the electrical power system.

15. The method of claim 10, wherein testing the hardware implementation of the stable design for the electrical power system comprises testing the hardware implementation of the stable design for the electrical power system for a plurality of operating conditions for the electrical power system corresponding to the plurality of simulated operating conditions for the electrical power system to generate the hardware testing data.

16. The method of claim 10 further comprising establishing requirements for damping circuits for the stable design for the electrical power system to reduce resonances in DC filters in the electrical power system.

17. The method of claim 10 further comprising establishing a validated simulation model of the validated stable design for the electrical power system.

18. The method of claim 10, wherein the electrical power system is the electrical power system for an aircraft.

19. A method for certifying a change to a design for a stable electrical power system, comprising:

establishing, using a design system having a processor coupled to a memory, an initial design for an electrical power system, wherein the initial design for the electrical power system satisfies design requirements for the electrical power system;

simulating, using a simulation system in communication with the design system, the initial design for the electrical power system for a plurality of simulated operating conditions for the electrical power system to generate simulation data;

establishing, using a stability evaluation system, stability parameter requirements for a stable design for the electrical power system from the simulation data;

testing, using a hardware testing system, a hardware implementation using the stability parameter requirements of the stable design for the electrical power system to generate hardware testing data;

validating, using the hardware testing system, the stable design against the design requirements for the electrical power system using the hardware testing data to establish a validated stable design for the electrical power system;

establishing a validated simulation model of the validated stable design for the electrical power system; and certifying a change to the validated stable design for the electrical power system by a simulation using the validated simulation model.

20. The method of claim 19, wherein the electrical power system comprises an AC power system configured to provide AC power, a DC power system configured to receive the AC power from the AC power system and to convert the AC power to DC power, and DC loads comprising a number of motor controllers configured to receive the DC power from the DC power system.

* * * * *